US012002606B2

(12) United States Patent
Lee et al.

(10) Patent No.: US 12,002,606 B2
(45) Date of Patent: Jun. 4, 2024

(54) FERRITE CORE AND COIL COMPONENT COMPRISING SAME

(71) Applicant: LG INNOTEK CO., LTD., Seoul (KR)

(72) Inventors: Hyun Ji Lee, Seoul (KR); Jai Hoon Yeom, Seoul (KR); Sung Hoon Kim, Seoul (KR); Seok Bae, Seoul (KR); Sang Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 982 days.

(21) Appl. No.: 16/965,109

(22) PCT Filed: Jan. 28, 2019

(86) PCT No.: PCT/KR2019/001153
§ 371 (c)(1),
(2) Date: Jul. 27, 2020

(87) PCT Pub. No.: WO2019/151730
PCT Pub. Date: Aug. 8, 2019

(65) Prior Publication Data

US 2021/0035717 A1 Feb. 4, 2021

(30) Foreign Application Priority Data

Feb. 1, 2018 (KR) ........................ 10-2018-0013053

(51) Int. Cl.
*H01F 1/11* (2006.01)
*H01F 1/03* (2006.01)
(Continued)

(52) U.S. Cl.
CPC ............... *H01F 1/11* (2013.01); *H01F 27/24* (2013.01); *H01F 27/28* (2013.01)

(58) Field of Classification Search
CPC ..... H01F 1/11; H01F 1/12; H01F 1/20; H01F 1/22; H01F 1/24; H01F 1/34; H01F 1/344;
(Continued)

(56) References Cited

U.S. PATENT DOCUMENTS 11,631,519 B2 * 4/2023 Lee ........................... H01F 1/36 428/692.1
2012/0286920 A1 * 11/2012 Chen ....................... H01F 1/344 977/932
2021/0035717 A1 * 2/2021 Lee ......................... H01F 27/24

FOREIGN PATENT DOCUMENTS

CN 103396111 11/2013
JP 05-299229 11/1993
(Continued)

OTHER PUBLICATIONS

Machine translation of WO-2006054749-A1, 40 pages. (Year: 2006).*
(Continued)

*Primary Examiner* — Matthew E. Hoban
*Assistant Examiner* — Lynne Edmondson
(74) *Attorney, Agent, or Firm* — KED & ASSOCIATES, LLP

(57) ABSTRACT

A ferrite core according to an embodiment of the present invention includes a plurality of grains including Mn at 30 to 40 mol %, Zn at 5 to 15 mol %, and Fe at 50 to 60 mol %, and a plurality of grain boundaries disposed between the plurality of grains, wherein the plurality of grains and the plurality of grain boundaries include Co, Ni, $SiO_2$, CaO, and $Ta_2O_5$, content of the Co and the Ni in the plurality of grains is two or more times higher than content of the Co and the Ni in the plurality of grain boundaries, content of the $SiO_2$, the CaO, and the $Ta_2O_5$ in the plurality of grain boundaries is two or more times higher than content of the $SiO_2$, the
(Continued)

CaO, and the $Ta_2O_5$ in the plurality of grains, a magnetic permeability is 3000 or more, and a core loss is 800 or less.

15 Claims, 5 Drawing Sheets

(51) Int. Cl.

| | |
|---|---|
| ***H01F 1/34*** | (2006.01) |
| ***H01F 27/24*** | (2006.01) |
| ***H01F 27/28*** | (2006.01) |

(58) Field of Classification Search

CPC . H01F 1/346; H01F 1/36; H01F 1/017; H01F 1/0315; H01F 1/0317; H01F 3/08; H01F 27/24; H01F 27/28; H01F 27/2895; H01F 27/255

See application file for complete search history.

(56) References Cited

FOREIGN PATENT DOCUMENTS

| | | | |
|---|---|---|---|
| JP | 06-310321 | 11/1994 | |
| JP | 11-283820 | 10/1999 | |
| JP | 2001-057305 | 2/2001 | |
| JP | 2004-300016 | 10/2004 | |
| JP | 2005-067950 | 3/2005 | |
| JP | 2006-273673 | 10/2006 | |
| JP | 2016-113328 | 6/2016 | |
| WO | WO-2006054749 A1 * | 5/2006 | ......... C04B 35/2658 |

OTHER PUBLICATIONS

Machine translation of JP2005-067950A, 10 pages. (Year: 2005).*

International Search Report dated May 3, 2019 issued in Application No. PCT/KR2019/001153.

Korean Office Action dated Dec. 21, 2021 issued in Application No. 10-2018-0013053.

* cited by examiner

[FIG. 1]
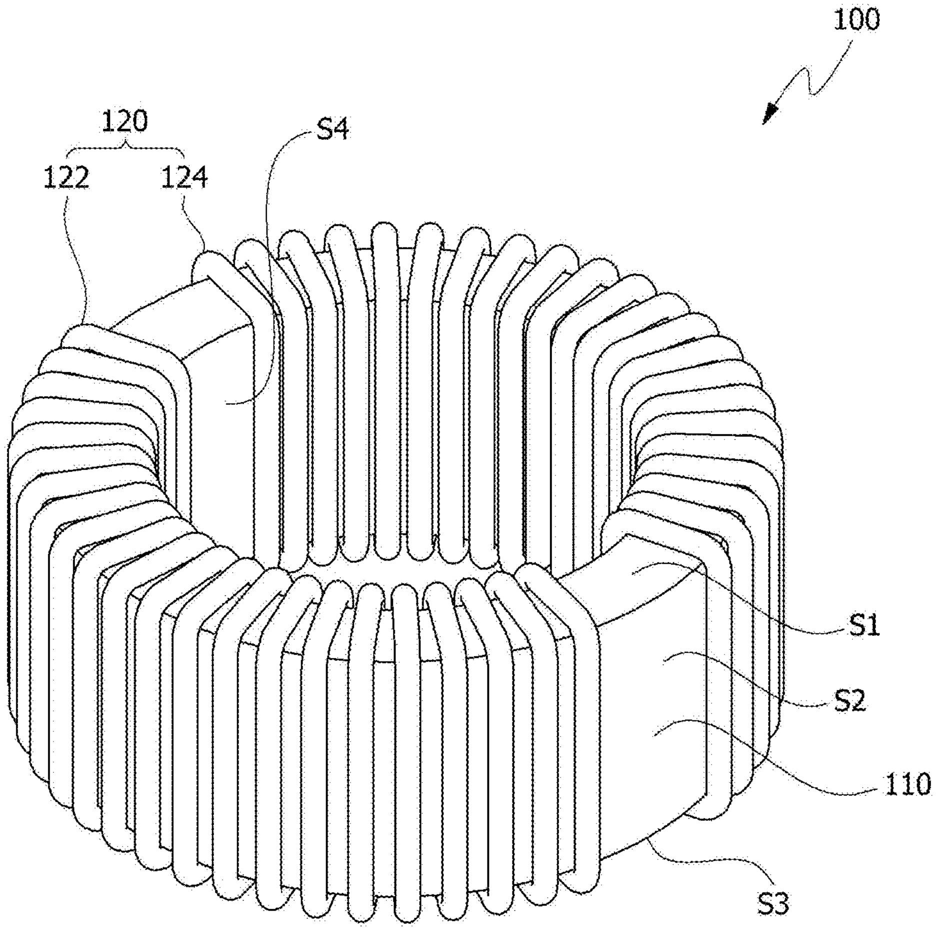

[FIG. 2]
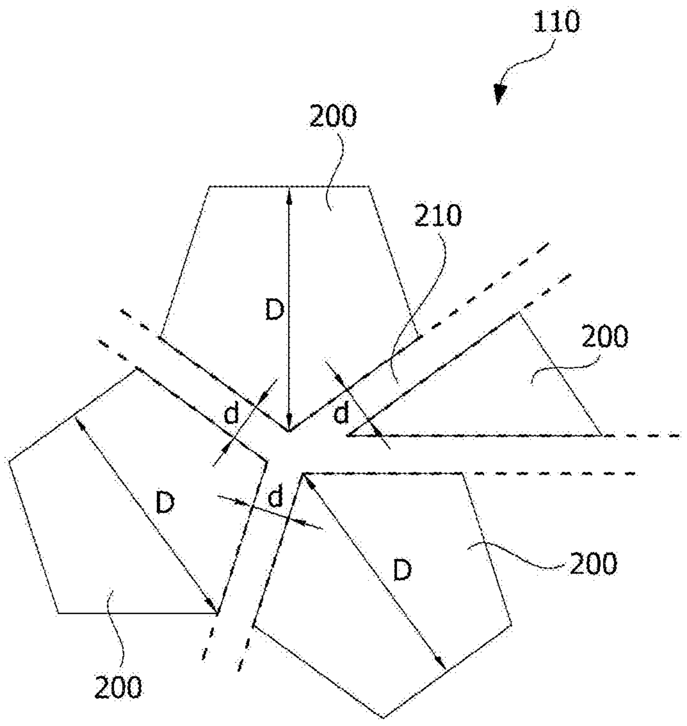
[FIG. 3]
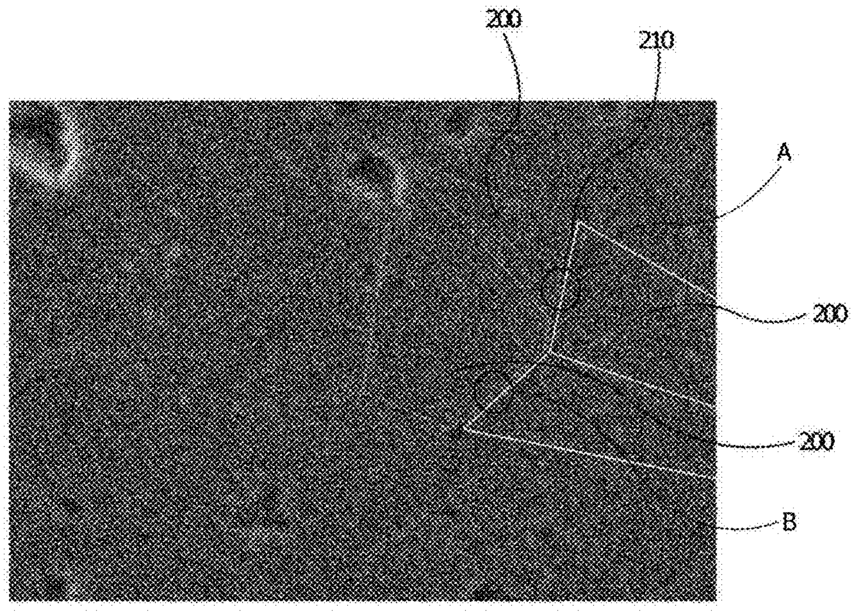

[FIG. 4]
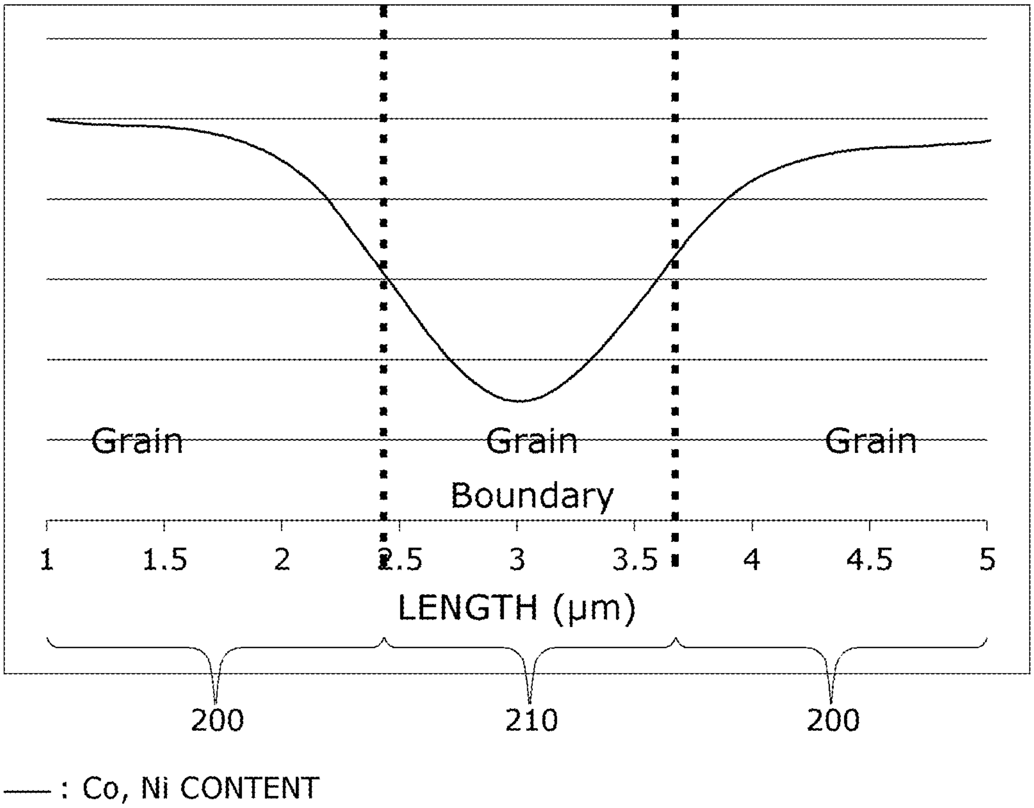

[FIG. 5]
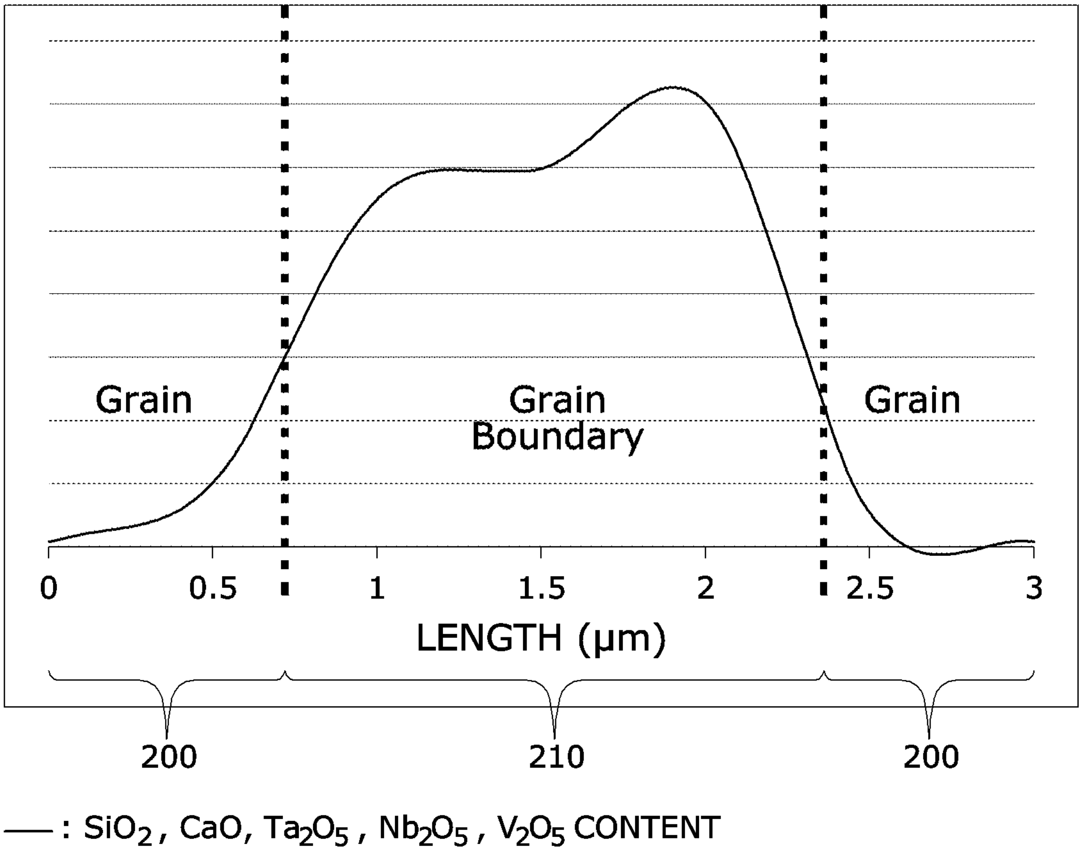
[FIG. 6]
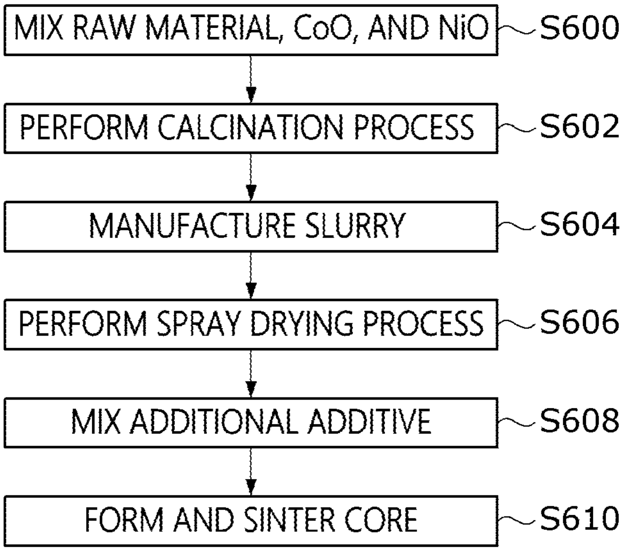

[FIG. 7]
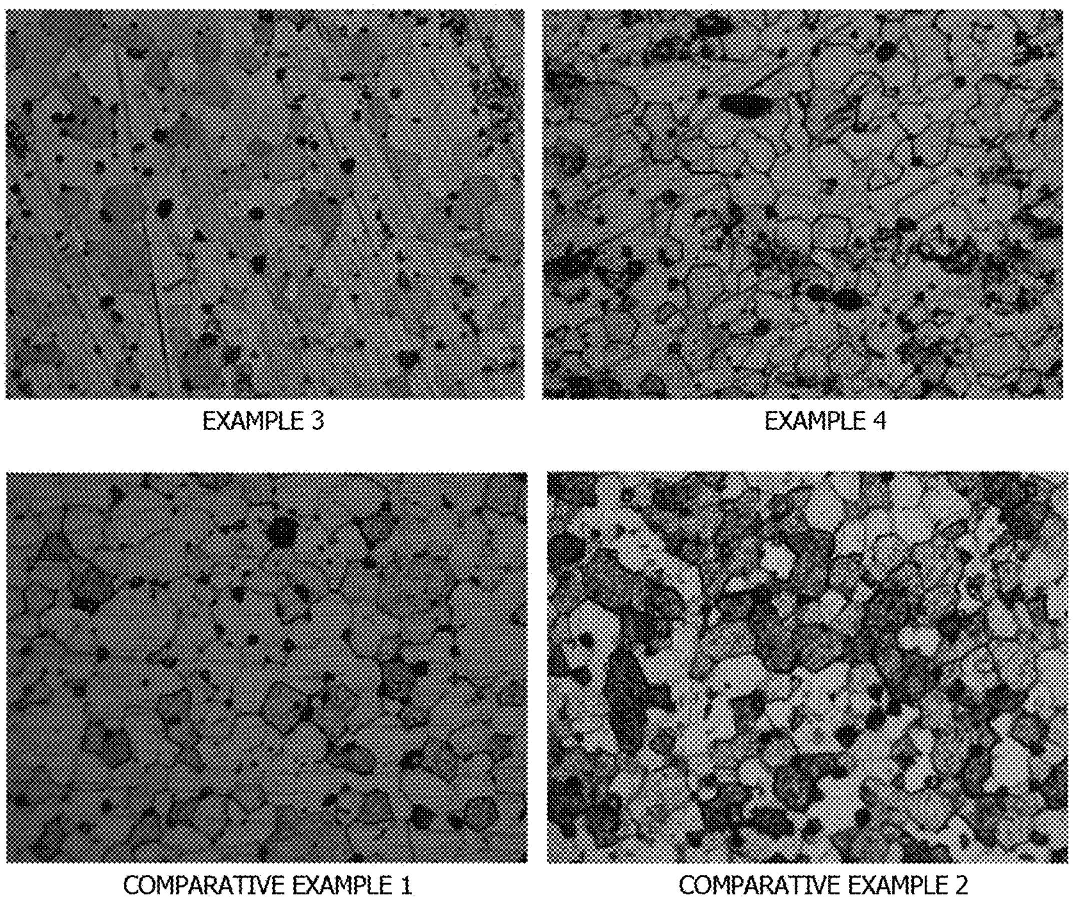

FERRITE CORE AND COIL COMPONENT COMPRISING SAME

CROSS-REFERENCE TO RELATED PATENT APPLICATIONS

This application is a U.S. National Stage Application under 35 U.S.C. § 371 of PCT Application No. PCT/KR2019/001153, filed Jan. 28, 2019, which claims priority to Korean Patent Application No. 10-2018-0013053, filed Feb. 1, 2018, whose entire disclosures are hereby incorporated by reference.

TECHNICAL FIELD

The present invention relates to a ferrite core, and more specifically, to a ferrite core and a coil component including the same.

BACKGROUND ART

According to the development of vehicle related technologies, interest in technologies of vehicle electrical components is growing. The technologies of vehicle electrical components may be mainly divided into vehicle semiconductor technologies, telematics technologies, vehicle display technologies, battery technologies, motor technologies, camera module technologies, and the like. The vehicle electrical components may include inductors, choke coils, transformers, motors, transformers for direct current (DC)/DC converters, electromagnetic interference (EMI) shielding members, and the like, and the vehicle electrical components may necessarily include coil components including ferrite cores and coils.

Generally, magnetic properties required for a ferrite core are a high magnetic permeability and a low core loss. In order to obtain the magnetic properties, a composition for the ferrite core may include various additives in addition to main materials included in the ferrite core.

However, some additives serve to improve the magnetic properties of the ferrite core but may increase grain boundaries between grains in the ferrite core. When the grain boundaries are increased between the grains in the ferrite core, a strength and formability of the ferrite core are lowered, and thus, there is a problem in that reliability of the ferrite core is decreased.

DISCLOSURE

Technical Problem

The present invention is directed to providing a ferrite core, which has excellent magnetic properties and formability, and a coil component including the same.

Technical Solution

One aspect of the present invention provides a ferrite core including a plurality of grains including Mn at 30 to 40 mol %, Zn at 5 to 15 mol %, and Fe at 50 to 60 mol %, and a plurality of grain boundaries disposed between the plurality of grains, wherein the plurality of grains and the plurality of grain boundaries include Co, Ni, SiO2, CaO, and Ta2O5, content of the Co and the Ni in the plurality of grains is two or more times higher than content of the Co and the Ni in the plurality of grain boundaries, content of the SiO2, the CaO, and the Ta2O5 in the plurality of grain boundaries is two or more times higher than content of the SiO2, the CaO, and the Ta2O5 in the plurality of grains, a magnetic permeability is 3000 or more, and a core loss is 800 or less.

The plurality of grains and the plurality of grain boundaries may further include Nb2O5 and V2O5, and the Nb2O5 and the V2O5 may be distributed in the plurality of grain boundaries to have content which is higher than content of the Nb2O5 and the V2O5 in the plurality of grains.

The SiO2 may be included at 1 to 200 ppm.

The SiO2 may be included at 50 to 150 ppm.

The Co may be included at 1500 to 5500 ppm.

The Ni may be included at 300 to 500 ppm.

The CaO may be included at 400 to 600 ppm.

The Ta2O5 may be included at 400 to 600 ppm.

The Nb2O5 may be included at 250 to 400 ppm.

The V2O5 may be included at 400 to 600 ppm.

An average separation distance between the plurality of grains may be in a range of 0.5 to 3 μm.

An average separation distance between the plurality of grains may be in a range of 1 to 2 μm.

An average grain diameter of the plurality of grains may be in a range of 3 to 16 μm.

An average grain diameter of the plurality of grains may be in a range of 7 to 12 μm.

One aspect of the present invention provides a coil component including an Mn—Zn based ferrite core and a coil wound around the Mn—Zn based ferrite core, wherein the Mn—Zn based ferrite core includes a plurality of grains including Mn at 30 to 40 mol %, Zn at 5 to 15 mol %, and Fe at 50 to 60 mol %, and a plurality of grain boundaries disposed between the plurality of grains, the plurality of grains and the plurality of grain boundaries include Co, Ni, SiO2, CaO, and Ta2O5, content of the Co and the Ni in the plurality of grains is two or more times higher than content of the Co and the Ni in the plurality of grain boundaries, content of the SiO2, the CaO, and the Ta2O5 in the plurality of grain boundaries is two or more times higher than content of the SiO2, the CaO, and the Ta2O5 in the plurality of grains, a magnetic permeability is 3000 or more, and a core loss is 800 or less.

Advantageous Effects

According to embodiments of the present invention, a ferrite core having a high magnetic permeability and a low core loss can be obtained. Particularly, the ferrite core according to the embodiment of the present invention can have excellent magnetic properties such as the magnetic permeability and the core loss, a high strength, and excellent formability and machinability. The ferrite core according to the embodiment of the present invention may be variously applied to vehicles or industrial applications.

DESCRIPTION OF DRAWINGS

FIG. 1 is a view illustrating one example of a coil component according to one embodiment of the present invention.

FIG. 2 is an enlarged view illustrating a part of a ferrite core according to one embodiment of the present invention.

FIG. 3 is an image, which is captured by an optical microscope, of the ferrite core according to one embodiment of the present invention.

FIG. 4 is a content distribution diagram of some additives in the ferrite core according to one embodiment of the present invention.

FIG. 5 is a content distribution diagram of the remaining additives in the ferrite core according to one embodiment of the present invention.

FIG. 6 is a flowchart illustrating a method of manufacturing a ferrite core according to one embodiment of the present invention.

FIG. 7 is a set of images, which are captured by an optical microscope, of Example 3, Example 4, Comparative Example 1, and Comparative Example 2.

MODES OF THE INVENTION

Since the present invention allows for various changes and numerous embodiments, specific embodiments will be illustrated in the drawings and described in detail in the written description. However, this is not intended to limit the present invention to the specific embodiments, and it is to be appreciated that all changes, equivalents, and substitutes that do not depart from the spirit and technical scope of the present invention are encompassed in the present invention.

Although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

The terminology used herein to describe the embodiments of the present invention is not intended to limit the scope of the present invention. The singular forms "a," "an," and "the" used in the present specification are intended to include the plural forms as well, unless the context clearly indicates otherwise. It should be understood that the terms "comprise," "comprising," "include," and/or "including," when used herein, specify the presence of stated features, numbers, steps, operations, elements, components, or combinations thereof, but do not preclude the presence or addition of one or more other features, numbers, steps, operations, elements, components, or combinations thereof.

Unless otherwise defined, all terms including technical and scientific terms used herein have the same meaning generally understood by those skilled in the art to which this invention belongs. The terms defined in generally used dictionaries are interpreted as including meanings identical to contextual meanings of the relevant art but not interpreted as being idealized or in an overly formal sense unless expressly so defined herein.

Embodiments of the invention will be described below in more detail with reference to the accompanying drawings. Components that are the same or correspond to each other are denoted by the same reference numeral regardless of the figure number, and redundant description will be omitted.

FIG. 1 is a view illustrating one example of a coil component according to one embodiment of the present invention.

Referring to FIG. 1, a coil component 100 includes a ferrite core 110 and a coil 120 wound around the ferrite core 110. In this case, the ferrite core 110 may have a toroidal shape, and the coil 120 may include a first coil 122 wound around the ferrite core 110 and a second coil 124 wound around the ferrite core 110 to be symmetrical to the first coil 122. The first coil 122 and the second coil 124 may be wound on an upper surface S1, an outer circumferential surface S2, a lower surface S3, and an inner circumferential surface S4 of the ferrite core 110 having the toroidal shape. A bobbin (not shown) for insulating the ferrite core 110 from the coil 120 may be further disposed between the ferrite core 110 and the coil 120. The coil 120 may be formed as a wire of which a surface is coated with an insulation material. The wire may be formed of copper, silver, aluminum, gold, nickel, tin, or the like of which a surface is coated with an insulation material, and a cross section of the wire may have a circular or angular shape.

The coil component according to the embodiment of the present invention may be variously applied to, for example, an inductor, a choke coil, a transformer, a motor, a transformer for a direct current (DC)/DC, and an electromagnetic interference (EMI) shield, but is not limited thereto, and may be variously applied to vehicles and industrial applications.

In this case, the coil component is illustrated in which the pair of coils are symmetrically wound around the ferrite core having the toroidal shape but is not limited thereto.

The ferrite core according to the embodiment of the present invention may be applied to a coil component having various shapes around which a coil is wound.

The ferrite core 110 according to one embodiment of the present invention may be a Mn—Zn based ferrite core including Mn, Zn, and Fe.

FIG. 2 is an enlarged view illustrating a part of the ferrite core according to one embodiment of the present invention, FIG. 3 is an image, which is captured by an optical microscope, of the ferrite core according to one embodiment of the present invention, FIG. 4 is a content distribution diagram of some additives in region A of FIG. 3 in the ferrite core according to one embodiment of the present invention, and FIG. 5 is a content distribution diagram of the remaining additives in region B of FIG. 3 in the ferrite core according to one embodiment of the present invention.

Referring to FIGS. 2 and 3, the ferrite core 110 according to one embodiment of the present invention includes grains 200 including Mn, Zn, and Fe and grain boundaries 210 disposed between the grains. In this case, the grains 200 may include Mn at 30 to 40 mol %, preferably 33 to 39 mol %, and more preferably 35 to 38 mol %, Zn at 5 to 15 mol %, preferably 7 to 13 mol %, and more preferably 9 to 11 mol %, and Fe at 50 to 60 mol %, preferably 51 to 57 mol %, and more preferably 52 to 54 mol % based on a total content of Mn, Zn, and Fe.

In addition, the ferrite core 110 according to one embodiment of the present invention may further include Co, Ni, SiO2, CaO, and Ta2O5. In addition, the ferrite core 110 according to one embodiment of the present invention may also further include Nb2O5 and V2O5.

In the ferrite core 110 according to one embodiment of the present invention, a composition of the grain 200 may be different from a composition of the grain boundary 210. Particularly, a content of at least one among Co, Ni, SiO2, CaO, and Ta2O5 in the grain 200 may be different from a content of at least one among Co, Ni, SiO2, CaO, and Ta2O5 in the grain boundary 210. In addition, a content of at least one of Nb2O5 and V2O5 in the grain 200 may be different from a content of at least one of Nb2O5 and V2O5 in the grain boundary 210. In the present specification, Co, Ni, SiO2, CaO, Ta2O5, Nb2O5, and V2O5 are described as being present in the grain 200 and/or the grain boundary 210, but may be described as being present in the forms of Co, Ni, Si, Ca, Ta, Nb, and V, respectively, therein.

Referring to FIGS. 4 and 5, Co and Ni may be distributed in the grains 200 to have content which is higher than content thereof in the grain boundaries 210 disposed between the grains 200, and SiO2, CaO, and Ta2O5 may be distributed in the grain boundaries 210 disposed between the grains to have content which is higher than content thereof in the grains 200. In addition, Nb2O5 and V2O5 may also be distributed in the grain boundaries 210 disposed between the grains to have content which is higher than content thereof in the grains 200. For example, Co and Ni may be distributed in the grains 200 to have content which is two or more times higher than content thereof in the grain boundaries 210 disposed between the grains 200, and SiO2, CaO, and Ta2O5 may be distributed in the grain boundaries 210 disposed between the grains to have content which is two or more times higher than content thereof in the grains 200. In addition, Nb2O5 and V2O5 may also be distributed in the grain boundaries 210 disposed between the grains to have content which is two or more times higher than content thereof in the grains 200. In this case, the content may refer to at least one among a weight ratio, a volume ratio, a molar ratio, and parts per million (ppm).

In this case, Co2+ may be substituted with Fe2+ in the grain 200. Accordingly, a content of Co in the grain 200 may be higher than a content thereof in the grain boundary 210, temperature dependence of a magnetic permeability of the ferrite core 110 may be improved due to the content, and magnetic anisotropy may be controlled through the content.

In addition, since Ni in the grain 200 replaces Zn of the ferrite core 110, a content of Ni in the grain 200 may be higher than a content thereof in the grain boundary 210, and a content of Fe2O3 is relatively increased due to Ni. Accordingly, a minimum temperature from which a core loss starts to occur may be increased.

Next, SiO2 may improve magnetic properties, move through the grain boundary 210, and induce growth of the grain 200. However, SiO2 may be included in the grain 200 at 1 to 200 ppm and preferably 50 to 150 ppm. When SiO2 is included therein at 200 ppm or more, the grain 200 may be overgrown so that an average grain diameter of the grains 200 become excessively large, an interval between the grains, that is, a length of the grain boundary 210 disposed between the grains 200, may also become large. Accordingly, a strength of the ferrite core may be weakened, a magnetic permeability thereof may be lowered, and a loss thereof may be increased.

Next, CaO may improve high frequency response of the ferrite core 110. In addition, since CaO is present in the grain boundary 210, CaO serves to reduce a hysteresis loss thereof.

Next, V2O5 forms a liquid film on the grain boundary 210 to serve to suppress growth of the grain 200 so that an eddy current loss thereof can be reduced.

Next, when Ta2O5 is present in the grain boundary 210, Ta2O5 may reduce resistance of the grain boundary and serve to suppress excessive growth of the grain 200.

In addition, when SiO2 and CaO are used together, CaO is extracted in the grain boundary 210 to increase resistance of the grain boundary 210 so as to serve to suppress excessive growth of the grain 200.

As described above, V2O5, Ta2O5, and SiO2+CaO serve to suppress excessive growth of the grain 200, and as a result, an eddy current loss can be reduced.

In addition, in a case in which SiO2 and CaO are used with Ta2O5, Ta2O5 helps CaO to be uniformly distributed in the grain boundary 210 so that a hysteresis loss can be reduced. In this case, Ta2O5 may be replaced with Nb2O5 or ZrO2, and Nb2O5 or ZrO2 may also serve the same function as Ta2O5 so that a hysteresis loss of the ferrite core 110 can be reduced.

As described above, in a case in which CaO, V2O5, Ta2O5, and SiO2 which control growth of the grain are distributed in the grain boundary to have content which is higher than content thereof in the grain, excessive growth of the grain can be suppressed, grain diameters of the grains can be controlled, the grain boundary, that is, a separation distance between the grains, can be reduced, and a eddy current loss and a hysteresis loss can be reduced.

Further referring to FIGS. 2 and 3, an average interval between the grains 200 in the ferrite core 110, that is, an average separation distance d between the grains 200 may be in a range of 0.5 to 3 μm and preferably 1 to 2 μm, and an average grain diameter D of the grains 200 may be in a range of 3 to 16 μm and preferably 7 to 12 μm. In a case in which the average separation distance d between the grains 200 and the average grain diameter D of the grains 200 satisfy the above-described value ranges, a ferrite core, of which a magnetic permeability is high, a core loss is low, and formability, machinability, and strength are excellent so that reliability is high, can be obtained.

In the present specification, the interval between the grains may be used with a distance between the grains, the grain boundary, a distance of the grain boundaries, a diameter of the grain boundary, an interval of the grain boundaries, and the like.

FIG. 6 is a flowchart illustrating a method of manufacturing a ferrite core according to one embodiment of the present invention.

Referring to FIG. 6, a raw material, CoO, and NiO are mixed (S600). In this case, the raw material may include Fe2O3, Mn3O4, and ZnO with purities of 99% or more, and the raw material, CoO, and NiO may be mixed using a ball mill for 12 to 24 hours and preferably about 18 hours at 20 to 30 rpm and preferably about 24 rpm. In this case, CoO may be added thereto at 1500 to 5500 ppm, preferably 2500 to 3500 ppm, and more preferably 3000 to 4000 ppm, and the NiO may be added thereto at 300 to 500 ppm and more preferably 350 to 450 ppm.

Next, a calcination process is performed on the mixed raw material, CoO, and NiO (S602). In this case, the mixed raw material, CoO, and NiO may be treated for 4 to 6 hours and preferably about 5 hours at a rate of temperature rise of about 3.33° C./min such that a maximum temperature thereof is 900 to 1000° C. and preferably about 950° C. A density of the raw material, CoO, and NiO mixed through the calcination process may be improved.

Next, a slurry is manufactured (S604). To this end, a powder on which the calcination process is performed may be mixed with a solvent, a binder, and a dispersant and stirred for 10 hours or more. In this case, the solvent may be distilled water, and the binder may be polyvinyl alcohol. The powder may include the binder at about 1 wt % and the dispersant at about 0.1 to 0.3 wt %.

Next, a spray drying process is performed (S606). To this end, the slurry may be continuously input to a chamber, and a rotary atomizer and a spray dryer may be used for the spray drying process. In this case, an inlet temperature of the chamber may be about 160° C. and an outlet temperature may be about 100° C., the slurry may be injected into the chamber at a rate of 12 kg/hr when a diameter of the chamber is about 1500 mm, and a speed of the rotary atomizer may be set to about 7000 rpm. When the spray drying process is performed, particles may be granulated to have a sphere shape.

Next, additional additives are mixed (S608). In this case, the additional additives may include SiO2, CaO, and Ta2O5. In addition, the additional additives may also further include Nb2O5, and V2O5. In this case, SiO2 may be added at 1 to 200 ppm and preferably 50 to 150 ppm, CaO may be added at 400 to 600 ppm and preferably 450 to 550 ppm, and Ta2O5 may be added at 400 to 600 ppm and preferably 450 to 550 ppm. In addition, the Nb2O5 may be added at 250 to 450 ppm and preferably 300 to 400 ppm, and the V2O5 may be added at 400 to 600 ppm and preferably 450 to 550 ppm.

Next, a core is formed and sintered (S610). To this end, the core may be formed with a pressure of 4 to 5 ton per unit area and formed at a maximum temperature of 1360° C. for 6 hours.

Next, a surface polishing process and the like may be further performed.

In a case in which a ferrite core is manufactured through such a process, since content of CoO and NiO in a grain may be high and content of CaO, V2O5, Ta2O5, and SiO2 in a grain boundary may be high, the ferrite core can be obtained so that a diameter of the grain and a distance between grains can be controlled and the ferrite core has a high strength, a high magnetic permeability, and a low loss.

Hereinafter, more detailed descriptions will be given with reference to Examples and Comparative Examples.

In order to manufacture Examples of the ferrite core according to the embodiment and Comparative Examples, Mn, Zn, and Fe are added at 36.3 mol %, 10 mol %, and 53.5 mol %, respectively, as raw materials, amounts of additional additives are adjusted according to Table 1 below, and a manufacturing method of FIG. 6 is performed.

TABLE 3

| Experimental No. | Strength (N) |
|---|---|
| Example 3 | 910 |
| Comparative Example 1 | 750 |

Referring to Tables 1 and 2, according to the embodiment of the present invention, a Mn—Zn based ferrite core of which a magnetic permeability is 3000 or more and a loss is 800 or less can be obtained. Particularly, in the case in which Nb2O5, and V2O5 are further added as additives as in Example 3, a loss can be lowered to 500 or less.

Referring to Tables 1 and 3, a strength was measured using a universal testing machine (UTM) under conditions of a maximum load of 970 N and a speed of 30 mm/min, and a strength of Example 3 may be seen to be greater than a strength of Comparative Example 1.

In addition, referring to FIG. 7, a grain boundary, that is, a separation distance between grains in each of Example 3 and Example 4 may be seen to be less than that between grains in each of Comparative Example 1 and Comparative Example 2. That is, in the case in which a content of SiO2 is limited to 1 to 200 ppm as in Example 3 and Example 4, excessive growth of the grain may be prevented so that an average grain diameter of the grains may be controlled to a level ranging from 3 to16 μm, and an average separation distance between the grains may be decreased to a level ranging from 0.5 to 3 μm, and thus a higher magnetic permeability and a lower core loss may be obtained. Particularly, in a case in which a content of SiO2 is limited to 50 to 150 ppm, an average separation distance between the grains may be further decreased, and thus a core loss may be seen to be further lowered.

TABLE 1

| Experimental No. | CoO (ppm) | NiO (ppm) | $Ta_2O_5$ (ppm) | CaO (ppm) | $SiO_2$ (ppm) | $Nb_2O_5$ (ppm) | $V_2O_5$ (ppm) |
|---|---|---|---|---|---|---|---|
| Example 1 | 3500 | 400 | 500 | 500 | 100 | — | — |
| Example 2 | 3500 | 400 | 500 | 500 | 100 | — | 500 |
| Example 3 | 3500 | 400 | 500 | 500 | 100 | 350 | 500 |
| Example 4 | 3500 | 400 | 500 | 500 | 200 | 350 | 500 |
| Comparative Example 1 | 3500 | 400 | 500 | 500 | 300 | 350 | 500 |
| Comparative Example 2 | 3500 | 400 | 500 | 500 | 400 | 350 | 500 |

Table 2 shows a result of measuring a magnetic permeability and a core loss of each of Examples of the ferrite core according to the embodiment and Comparative Examples, and Table 3 shows a result of measuring a strength of each of Example 3 of the ferrite core and Comparative Example 1, and FIG. 7 is a set of images, which are captured by an optical microscope, of Example 3, Example 4, Comparative Example 1, and Comparative Example 2.

TABLE 2

| Experimental No. | Magnetic Permeability ($\mu/\mu_0$) | Loss (mw/cc) |
|---|---|---|
| Example 1 | 3008 | 732 |
| Example 2 | 3001 | 632 |
| Example 3 | 3321 | 423 |
| Example 4 | 3379 | 501 |
| Comparative Example 1 | 3629 | 852 |
| Comparative Example 2 | 3866 | 997 |

While the invention has been described with reference to the exemplary embodiments thereof, it will be understood by those skilled in the art that various changes may be made therein without departing from the spirit and scope of the invention as defined by the appended claims.

The invention claimed is:

1. A ferrite core comprising:

a plurality of grains including Mn at 30 to 40 mol %, Zn at 5 to 15 mol %, and Fe at 50 to 60 mol %; and a plurality of grain boundaries disposed between the plurality of grains, wherein the plurality of grains and the plurality of grain boundaries include Co, Ni, $SiO_2$, CaO, and $Ta_2O_5$, content of the Co and the Ni in the plurality of grains is two or more times higher than content of the Co and the Ni in the plurality of grain boundaries, content of the $SiO_2$, the CaO, and the $Ta_2O_5$ in the plurality of grain boundaries is two or more times higher than content of the $SiO_2$, the CaO, and the $Ta_2O_5$ in the plurality of grains, an average separation distance between the plurality of grains is in a range of 1 to 2 μm, and an average grain diameter of the plurality of grains is in a range of 7 to 12 μm.

2. The ferrite core of claim 1, wherein:

the plurality of grains and the plurality of grain boundaries further include $Nb_2O_5$ and $V_2O_5$; and the $Nb_2O_5$ and the $V_2O_5$ are distributed in the plurality of grain boundaries to have content which is higher than content of the $Nb_2O_5$ and the $V_2O_5$ in the plurality of grains.

3. The ferrite core of claim 1, wherein the $SiO_2$ is included at 1 to 200 ppm.

4. The ferrite core of claim 3, wherein the $SiO_2$ is included at 50 to 150 ppm.

5. A coil component comprising:

an Mn—Zn based ferrite core; and a coil wound around the Mn—Zn based ferrite core, wherein the Mn—Zn based ferrite core includes a plurality of grains including Mn at 30 to 40 mol %, Zn at 5 to 15 mol %, and Fe at 50 to 60 mol %, and a plurality of grain boundaries disposed between the plurality of grains, the plurality of grains and the plurality of grain boundaries include Co, Ni, $SiO_2$, CaO, and $Ta_2O_5$, content of the Co and the Ni in the plurality of grains is two or more times higher than content of the Co and the Ni in the plurality of grain boundaries, content of the $SiO_2$, the CaO, and the $Ta_2O_5$ in the plurality of grain boundaries is two or more times higher than content of the $SiO_2$, the CaO, and the $Ta_2O_5$ in the plurality of grains, an average separation distance between the plurality of grains is in a range of 1 to 2 μm, and an average grain diameter of the plurality of grains is in a range of 7 to 12 μm.

6. The coil component of claim 5, wherein:

the Mn—Zn based ferrite core has a toroidal shape.

7. The coil component of claim 6, wherein:

the coil includes a first coil wound around the Mn—Zn based ferrite core and a second coil wound around the Mn—Zn based ferrite core to be symmetrical to the first coil.

8. The coil component of claim 5, further comprising a bobbin disposed between the Mn—Zn based ferrite core and the coil.

9. The coil component of claim 5, wherein:

the plurality of grains and the plurality of grain boundaries further include $Nb_2O_5$ and $V_2O_5$; and the $Nb_2O_5$ and the $V_2O_5$ are distributed in the plurality of grain boundaries to have content which is higher than content of the $Nb_2O_5$ and the $V_2O_5$ in the plurality of grains.

10. The ferrite core of claim 1, wherein the Co is included at 1500 to 5500 ppm.

11. The ferrite core of claim 1, wherein the Ni is included at 300 to 500 ppm.

12. The ferrite core of claim 1, wherein the CaO is included at 400 to 600 ppm.

13. The ferrite core of claim 1, wherein the $Ta_2O_5$ is included at 400 to 600 ppm.

14. The ferrite core of claim 2, wherein the $Nb_2O_5$ is included at 250 to 400 ppm.

15. The ferrite core of claim 2, wherein the $V_2O_5$ is included at 400 to 600 ppm.

* * * * *